(12) United States Patent
Casey

(10) Patent No.: US 8,175,618 B2
(45) Date of Patent: May 8, 2012

(54) MOBILE DEVICE PRODUCT LOCATOR

(75) Inventor: Steven M. Casey, Littleton, CO (US)

(73) Assignee: Qwest Communications International Inc., Denver, CO (US)

( * ) Notice: Subject to any disclaimer, the term of this patent is extended or adjusted under 35 U.S.C. 154(b) by 897 days.

(21) Appl. No.: 11/288,630

(22) Filed: Nov. 28, 2005

(65) Prior Publication Data

US 2007/0123270 A1    May 31, 2007

(51) Int. Cl.
*H04Q 7/20*    (2006.01)
(52) U.S. Cl. ............... 455/456.3; 455/456.1; 701/200; 701/211; 348/231.3
(58) Field of Classification Search ............... 455/456.3, 455/456.1, 414.2, 414.3; 701/200, 208, 207, 701/214, 213
See application file for complete search history.

(56) References Cited

U.S. PATENT DOCUMENTS

| | | | | |
|---|---|---|---|---|
| 7,130,742 B2 * | 10/2006 | Kobuya et al. | ................ | 701/207 |
| 7,383,123 B2 * | 6/2008 | Park | ............................ | 701/200 |
| 2001/0040627 A1 * | 11/2001 | Obradovich | .................. | 348/222 |
| 2004/0174443 A1 * | 9/2004 | Simske | ....................... | 348/231.3 |
| 2005/0222767 A1 * | 10/2005 | Odamura | ...................... | 701/213 |
| 2006/0111143 A1 * | 5/2006 | Pande et al. | ............... | 455/556.1 |
| 2009/0037103 A1 * | 2/2009 | Herbst et al. | .................. | 701/211 |

* cited by examiner

*Primary Examiner* — Kent Chang
*Assistant Examiner* — Kashif Siddiqui
(74) *Attorney, Agent, or Firm* — Swanson & Bratschun, L.L.C.

(57) ABSTRACT

Systems, methods, and software are described for identifying a location with a mobile communications device. According to various embodiments of the invention, an electronic image is captured via the mobile communications device. A first set of data identifying the location of the mobile communications device may be received, and the first set of data may be associated with the electronic image. At a later time, an identifier of the captured image may then be selected, and a suggested route or a map which includes the location associated with captured image may then be created.

13 Claims, 7 Drawing Sheets

MOBILE DEVICE PRODUCT LOCATOR

BACKGROUND OF THE INVENTION

Embodiments of the invention generally relate to mobile communications devices and wireless networking. More specifically, they relate to systems and methods for using a mobile communications device to identify a location.

The technology related to the capture of digital images has developed extensively over the past ten years, and the components related to such technology have seen significant price decreases. As this technology has developed, image capture devices such as digital cameras have increasingly been integrated into mobile devices such as cellular phones or personal digital assistants ("PDAs").

Moreover, GPS chipsets and other location determination technology have seen rapid advancement as well. Again, as GPS receivers have become smaller in size and much less expensive, such components have increasingly been integrated into a wide variety of mobile devices. The performance of such receivers has also increased and, thus, the granularity of location identification has improved as well.

Technology related to mobile communications devices, and the networks upon which they operate, have also seen breakthroughs. The ability to transmit data with wireless devices has significantly improved. There is, thus, a need in the art for further integration of these different systems, devices and technologies to provide new functionality.

BRIEF SUMMARY OF THE INVENTION

Systems, methods, and software are described for identifying a location with a mobile communications device. According to some embodiments of the invention, an image may be captured with an image capture device coupled with the mobile communications device. A first set of data identifying the location of the mobile communications device may be received, and the first set of data may be associated with the electronic image. Later, an identifier of the captured image may be selected. In some embodiments, image data may be created comprising a map which includes the location associated with the captured image. The captured image may also be included in the image data. In other embodiments, a suggested route to the location associated with the captured image may be created.

Once the set of data identifying the location and the captured image have been associated with each other, the device may continue to receive and store additional sets of location data. In various embodiments, such reception may occur over a specific time period, or may occur at regular intervals. These additional sets of data may be represented as waypoints in the created image data. Such additional sets of data may also comprise a suggested route. In some embodiments, the suggested route may comprise a suggested route from the current location of the mobile communications device to the location associated with the captured image. In various embodiments, the different steps may be performed by the mobile communications device, the locator server, or any combination thereof. In certain embodiments, the set of data identifying the location may comprise GPS coordinates. The methods of the invention described above may be embodied in a computer-readable storage medium having a computer program embodied therein.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following systems, methods, and software may be components of a larger system, wherein other procedures may take precedence over or otherwise modify their application. Also, a number of steps may be required before, after, or concurrently with the following embodiments.

I. Overview: Systems, methods, and software are described for identifying a location with a mobile communications device. According to some embodiments of the invention, an electronic image is captured via the mobile communications device. A first set of data identifying the location of the mobile communications device may be received, and the first set of data may be associated with the electronic image. Later, an identifier of the electronic image may be selected, and image data may be created comprising a map which includes the location associated with the image.

Figure 1A:
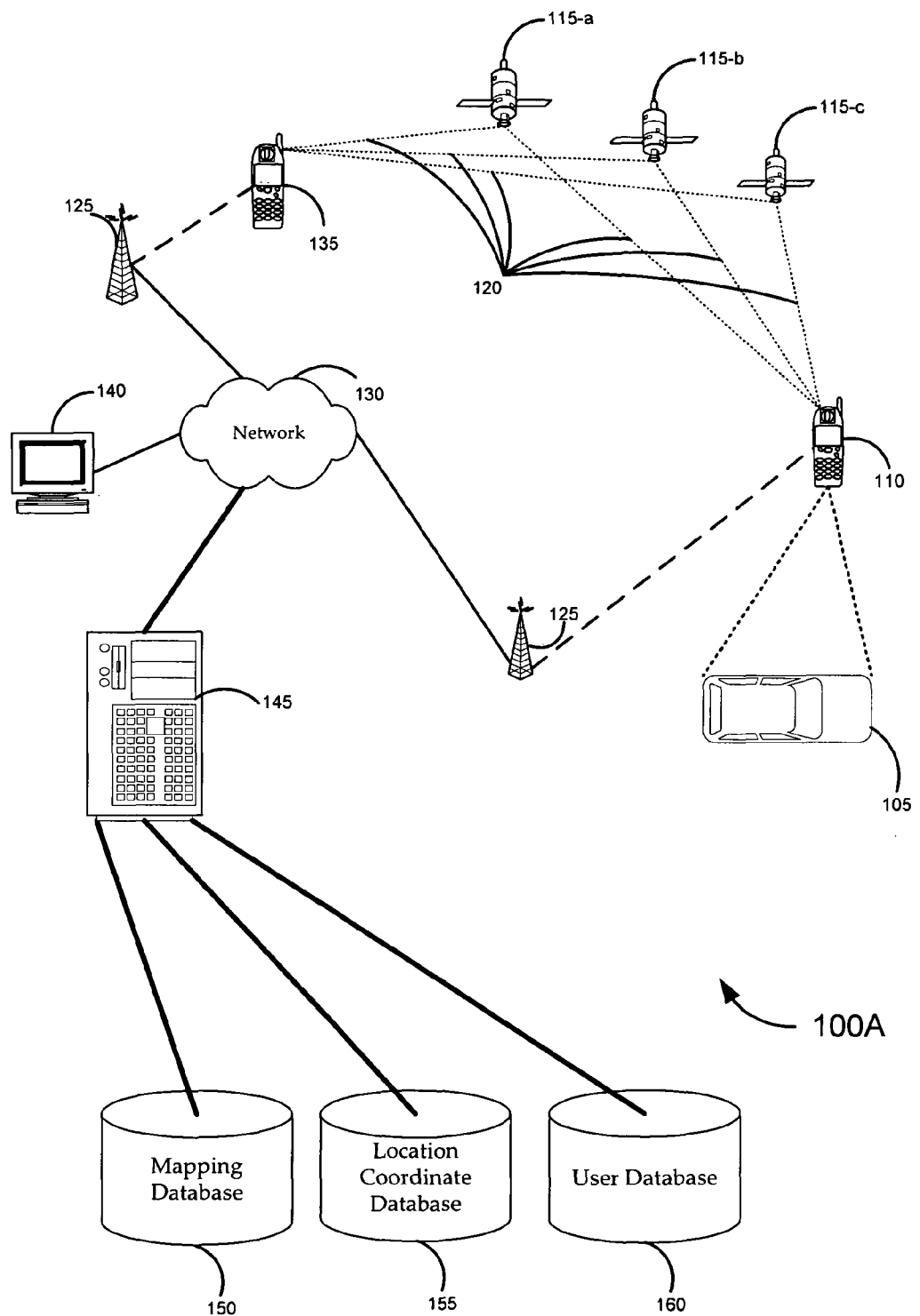
FIG. 1A illustrates a communications system that may be used to identify a location using a mobile communications device according to various embodiments of the present invention.
Figure 1B:
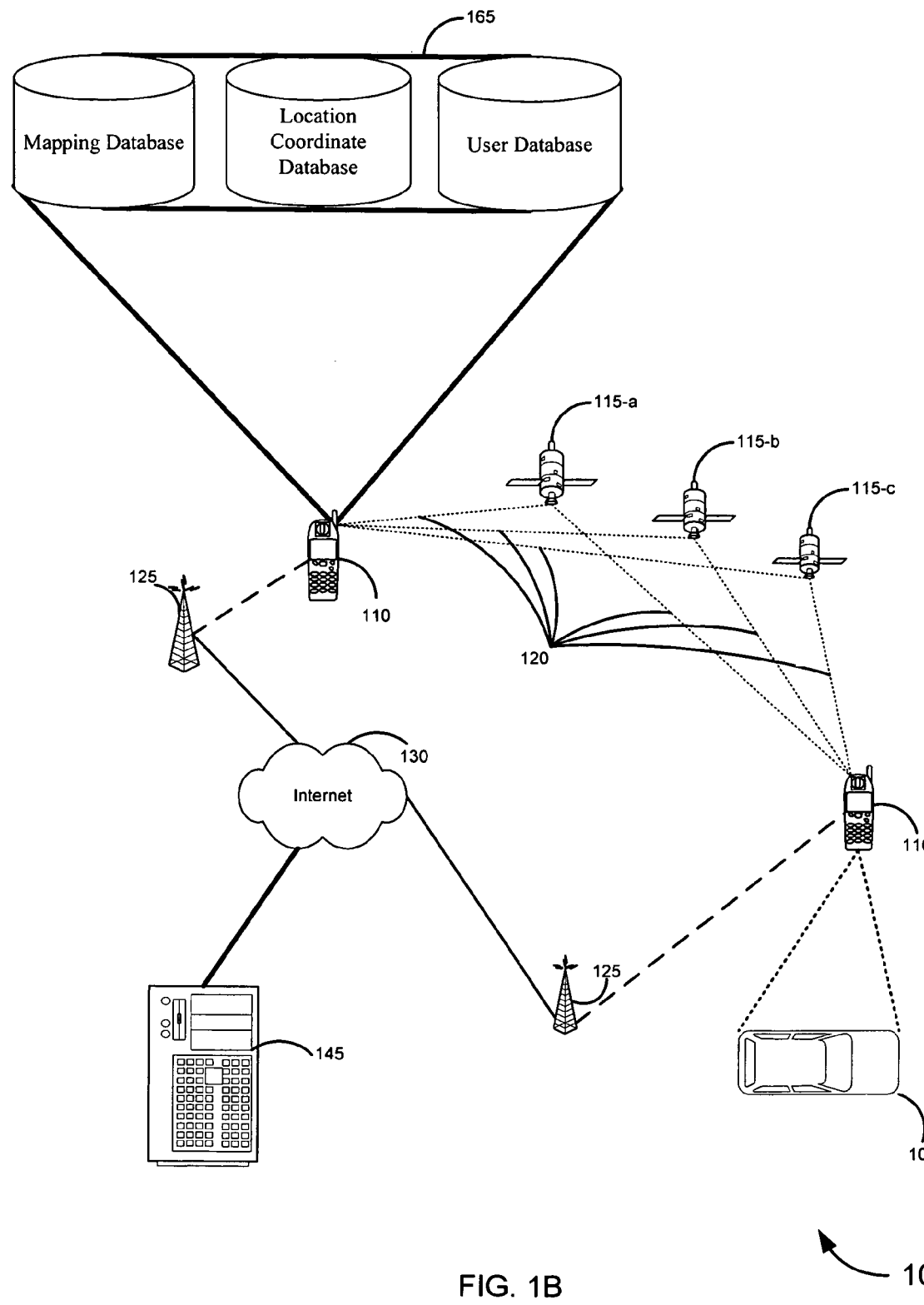
FIG. 1B illustrates an alternative communications system that may be used to identify a location using a mobile communications device according to various embodiments of the present invention.

II. System Architecture: FIG. 1A illustrates an example of Communications Systems 100A within which various embodiments of the present invention may be included. FIG. 1B illustrates an example of a second Communications Systems 100B within which various embodiments of the present invention may be included. The components of each system may be directly connected, or may be connected via a Network 130, which may be any combination of the following: the Internet, an IP network, an intranet, a wide-area network ("WAN"), a local-area network ("LAN"), a virtual private network, the Public Switched Telephone Network ("PSTN"), or any other type of network supporting data communication between devices described herein, in different embodiments. A Network 130 may include both wired and wireless connections, including optical links. Many other examples are possible and apparent to those skilled in the art in light of this disclosure. In the discussion that follows, a Network 130 may or may not be noted specifically. If no specific means of connection is noted, it may be assumed that the link, communication or other connection between devices may be via a Network 130.

A. Device—Image Capture: In some embodiments, elements of the invention may be controlled via a Locator Application stored on the computer readable medium of a Mobile Communications Device 110. The application may include instructions executable to provide a graphical user interface on a screen coupled with the Device 110. The invention may be initiated when a user opens the application, with the user indicating that he or she wants to proceed with the locator functionality.

According to various embodiments of the present invention, an image is then captured by an image capture device coupled with a Mobile Communications Device 110. The image capture device may, for example, comprise a digital camera integrated into or otherwise coupled with the Mobile Communications Device 110, producing still or motion images. The image capture device may comprise any device that converts light from real world or virtual images into electrically or chemically collected images. The image captured may comprise image data. In various embodiments, the image captured 105 may comprise an image of an automobile, a product, a location, a person, any other physical item, or any combination thereof.

The Mobile Communications Device 110 may be a cellular phone, a VoIP phone, a personal digital assistant, a pager, a text messaging device, a laptop, a portable digital music player, a two way radio, any mobile phone or other mobile device, or any combination of the foregoing. According to some embodiments, the Device 110 communicates with a Locator Server 145 through a Mobile Communications Base Station 125, at least a portion of which is wireless. A captured electronic image may be transmitted as image data to the Locator Server 145 for storage in a User Database 160. The Device 110 may also create a thumbnail or other identifier (e.g., alphanumeric, or an icon) of the image for transmission to the Locator Server 145. Alternatively, the electronic image, or a thumbnail or otherwise compressed version thereof, may be stored in a User Database 165 on a computer readable medium integrated into the Device 110, as illustrated in FIG. 1B.

In addition to the captured image, a set of data identifying the location of the device may also be received. The Device 110 may, thus, be configured to receive a set of data identifying the location of the Device 110. The Device 110 may be directly or indirectly coupled with a receiver component which enables the reception of location based information, also referred to herein as "set of data identifying the location" or "location based data." The location based information may be received by hardware configured to receive the set of data identifying the location of the device. The receiver may be coupled with the Mobile Communications Device 110 in any suitable manner known in the art. By way of example, it may be an integrated component or may be a stand alone receiver otherwise communicating with the Device 110. In some embodiments, the hardware may be removable from the device, and then coupled with another network connected device to provide similar functionality without reconfiguration of the hardware. An example of such a component is a GPS receiver communicatively coupled with the Device 105 with a USB connection. In other embodiments, the hardware configured to receive the set of data identifying the location of the Device 105 may comprise other GPS receiver configurations. Therefore, the location based information may comprise GPS coordinate data 120. A receiver may, alternatively, comprise any other combination of hardware and software to achieve the functionality described above.

The location based information may be in the form of Satellite 115 location information, cellular location information, network analysis of location information, location information specific to a building, or other means for location determination. The location based information may be based on triangulation using cellular towers or access points. The location based information may be GPS coordinates or any other GPS related location information. The location based information may include altitude information also. Cellular carriers may employ a variety of means of locating cellular telephones and other mobile computing devices using cellular towers. By way of example, the time difference of arrival, angle of arrival, and location pattern matching methods are well known in the art as alternative means of obtaining location information. Additionally, any combination of the above may be used as well, and it is anticipated that location technologies will evolve and "set of data identifying the location of the device" is to be interpreted to include the reception of new forms of location based data.

In some embodiments, the location based information may be stored in a User Database 160 on the Device 110, where it may be associated or otherwise linked with the captured image. The Locator Application may include functionality which automatically creates the association. Alternatively, the association may be done manually via a user interface configured to link a captured image to location based data. The location based information may also be transmitted to the Locator Server 145 for storage in a User Database 160. From the Locator Server 145, the location based information may be directed to another mobile device other computing device over the Network 130. Alternatively, the location based information may be distributed to another computing device via an email or other electronic message, or any other manner as known in the art.

In certain embodiments, the Device 110 may continue to receive additional location based data which relates to an association. By way of example, after an association is made, the Device 110 may automatically store location based data every minute for 10 minutes. A Device 110 may be configured to store such waypoints automatically, or only when requested by a user. The storage may occur for a period set by a user, or for a preset time period. The intervals may vary as well. The waypoint data may be stored on the Device 110, or transmitted to the Locator Server 145.

B. Locator Server: According to various embodiments of the invention, the systems may include a Locator Server 145. The Locator Server 145 may include, for example, one or more server computers, personal computers, workstations, web servers, or other suitable computing devices. The Locator Server 145 may be fully located within a single facility or distributed geographically, in which case a Network 130, as described above, may be used to integrate different components. A Locator Server 145 may include any computing device configured to receive location based data or receive captured image data (or a thumbnail, or compressed version, thereof). Application software running on the Locator Server 145 may receive a request to identify the location associated with a captured image, and create a map comprising the location.

The Locator Server 145 may be in communication with one or more databases, such as a Mapping Database 150, a Location Coordinate Database 155, or a User Database 160. According to different embodiments of the invention, a database may include any number of tables and sets of tables. In addition, the databases described below may comprise a single database. Application software running on the Locator Server 145 may query the applicable databases, and produce image data, suggested route data, maps, or other output as dictated by the application software. Each database may be incorporated within the Locator Server 145 (e.g., within its storage media), or may be a part of a separate system associated with the Locator Server 145. Each database may be fully located within a single facility, or distributed geographically. In some embodiments, one or more of the databases discussed herein may be stored, in whole or in part, on the Device 110. Therefore, in different embodiments of the invention, the databases and applications associated therewith may be stored in varying configurations on the Device 110, the Locator Server, or any combination thereof. Each database may be organized in any manner different than described above to provide the functionality called for by the various embodiments, as known by those skilled in the art.

According to some embodiments, the Locator Server 145 may be may be in communication with a User Database 160. This database may include information regarding users and his or her Device 110. The User Database 160 for a particular user may include user preferences regarding mapping options. When the Locator Server 145 receives location based data, or receives data comprising a captured image (or a thumbnail, or compressed version, thereof), this data may be stored in the User Database 160 and associated with a user. One or more graphical user interfaces may be provided by the Locator Server 145 to allow a user to modify various aspects of their profile from a Device 110, from a desktop computer connected to a Network 130, or from a variety of other devices communicatively coupled to or otherwise in communication with a Network 130. A user interface may be configured to allow a user to retrieve location based data associated with a captured image, thumbnail or compressed image.

In various embodiments, as described above, the Locator Server 145 may receive a number of additional sets of data, each identifying the location of the mobile communications device at a different time. Each additional set may represent the location of the Device 110 measured at a regular time interval after a first set of data identifying the location of the Device 110 is received or stored. The additional sets may be used to create a map comprising a graphical representation of each location identified by the plurality of additional sets of data. This data may be stored in the User Database 160.

The Locator Server 145 may be associated with a Location Coordinate Database 155. This database may include data which may be used to create geographic coordinates by analyzing and processing the diverse forms of location based data which may be stored in a User Database. The geographic coordinates may then be used by the Locator Server 145 in conjunction with the Mapping Database 150 to create the output described herein. The Location Coordinate Database 155 (or the User Database 160) may also contain a number of "logical location" mappings to locations in the Mapping Database 150, wherein different locations are associated with businesses and points of interest (i.e. home, residences of friends and family, regular travel routes, etc.) situated in those locations. These "logical location" mappings may be user specific, applicable to more than one user, or applicable to public locations (retail, parks, etc.).

In various embodiments, the Locator Server 145 includes application software comprising complex mapping functionality in order to create mapping data based on received location based data. Such mapping tools are well known in the art. The mapping data (e.g., information on topography, roads, cities, etc.) necessary to create maps for a given geographic region or regions may be stored in a Mapping Database 150 communicatively coupled with the Locator Server 145. The functionality included in the tools may include the ability to formulate maps with different icons and markers to indicate different location types in various geographic regions. Any number of inputs may dictate how such icons and markers will be placed on a given map, the geographic region contained on the map, and the map features. One skilled in the art will recognize how such tools may be utilized in various embodiments of the invention.

The Mapping Database 150 may include tables of data related to streets, buildings, malls, parks, lakes, rivers, mountains, and other related geographic and topographic information. Size, shape, location, and name information related to the locations may thereby be associated with certain coordinates. Tables may be comprised of data on large geographic areas, such as countries, states, and counties. Tables may also be comprised of smaller geographic areas, such as urban areas, cities, communities, and the like. Tables may include street names, address numbers and ranges, street class and type, speed limits, and supplemental attributes. Different sizes, shapes, colors, dots, icons, and fonts may be used to indicate different features. The Mapping Database 150 may be used to determine destinations, distances, or directions for navigation purposes. The content of the electronic map database may include any combination of the aforementioned attributes and information. The design and organization of the aforementioned tables is discretionary and within the skill of those of ordinary skill in the art, given the descriptions of data fields herein.

C. Location/Route Mapping: Once location based data and a captured image have been associated with one another, the mapping and suggested route functionality associated with the invention may be applied. In one embodiment, the Device 110 itself may be configured to have the functionality embodied therein, as illustrated in FIG. 1B. To initiate the process, a user of the Device may open the Locator Application on the Device 110.

A user interface associated with the Locator Application may include a menu with any number of identifiers, each identifier linked to a different association between location based data and a captured image. The user interface may be configured to allow a user to scroll through captured images or identifiers, and then select a particular captured image or identifier upon which to apply the mapping or suggested route functionality. An identifier may be an icon, the captured electronic image, a thumbnail or otherwise modified representation of the captured electronic image, a user-selected word, any other combination of characters, or any combination of the foregoing. The identifier linked to an association may be selected by the user, or created automatically. For example, a car icon could be an identifier associated with the location identifying where a car was parked. In another example, a thumbnail representation of the captured image of a product may represent the identifier for an association identifying the location of a product in a retail store. A user may then select an identifier from the menu to choose an association.

Figure 2A:
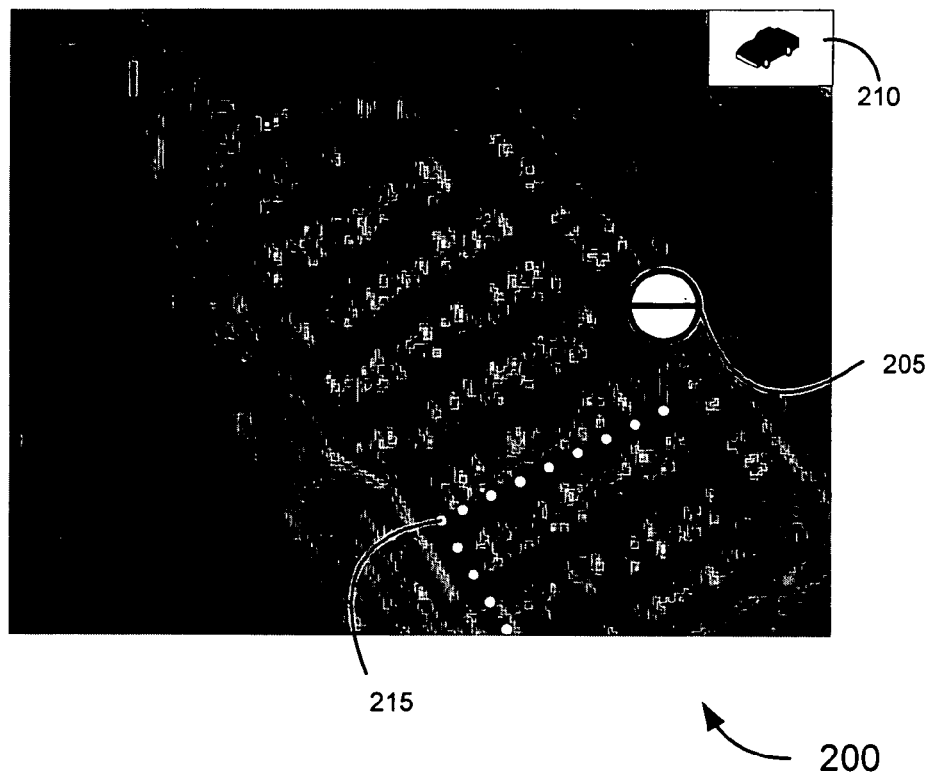
FIG. 2A illustrates image data identifying a location according to various embodiments of the present invention.

In certain embodiments, the Mapping Database 150, a Location Coordinate Database 155, or a User Database 160 are stored on the storage medium on the Device 110 itself, as in FIG. 2A. In such embodiments, once a user selects an identifier, the Locator Application may access its User Database 160 to retrieve the location based data related to the association. The Locator Application may then access the Location Coordinate Database 155 to determine the geographic coordinates associated with the location based data. The Locator Application may then access the Mapping Database 150 to create image data which comprises a map which includes a graphical representation of the location identified by the location data. The map may, for example, also include a representation of the stored waypoints, the identifier, and the image itself.

One example 200 of image data is illustrated in FIG. 2A. In this embodiment, the image data comprises a satellite image of a parking lot, but many other types of map images are contemplated as well. In this example, the graphical representation of the location based data is shown at reference numeral 205. In this exemplary embodiment, reference numeral 210 illustrates an area illustrating an icon representing the identifier linked with the association. However, in other embodiments, the area indicated by reference numeral 210 may include the captured image, or a thumbnail or otherwise modified representation of the captured image. In some embodiments, the area 210 is not included. The white dots represented by reference numeral 215 comprise waypoint measurements illustrating the path traveled by the device after the association was made.

Figure 2B:
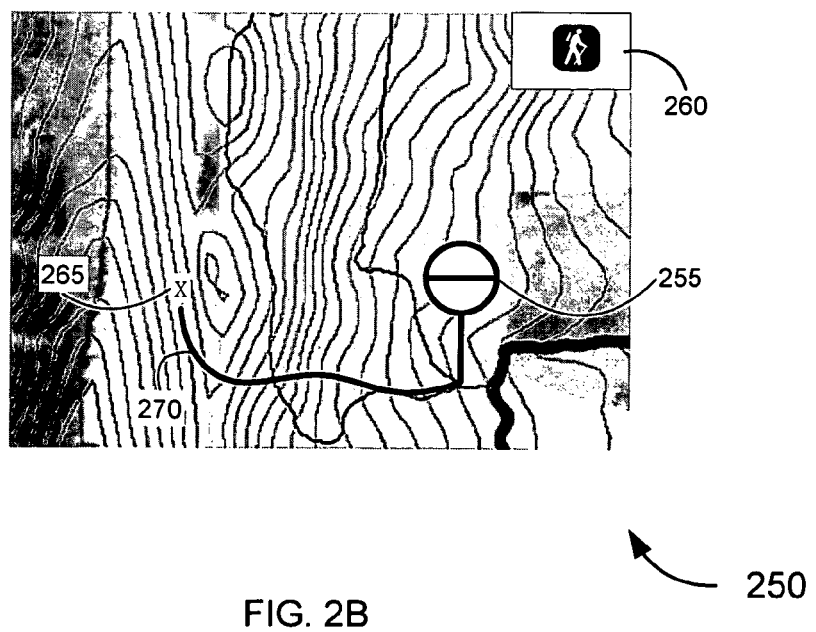
FIG. 2B illustrates a map identifying a location according to various embodiments of the present invention.

FIG. 2B provides another example 250 of image data. In this embodiment, the image data comprises a topographical map. In this example, the graphical representation of the location based data is shown at reference numeral 255. Reference numeral 260 illustrates an area containing an icon representing the identifier linked with the association. Reference numeral 265 provides an illustration of the current location of the Device 110. Reference numeral 270 shows an illustration of a suggested route from the current location of the Device 110 to the location associated with the captured image. Many other variations of maps, suggested routes, and other forms of image data are contemplated, and are apparent to one skilled in the art.

The Mapping Database 150, Location Coordinate Database 155, and User Database 160 may comprise, in whole or in part, a separate database or databases not on the Device 110 itself, as illustrated in FIG. 1A. Due to power, storage, and processing limitations inherent in many mobile devices, shifting the processing burden to a Locator Server 145 may provide benefits. Therefore, the functionality of the Locator Application may, in whole or in part, be included on the computer readable medium of the Locator Server 145 instead of, or in addition to, the Device 110.

The mapping and suggested route functionality associated with the invention may also be initiated by another mobile communications device 135 or other computing device 140 connected to the Internet. In such embodiments, the mobile communications device 135 or other computing device 140 may be in communication with the Locator Server 145. The Locator Server 145 may provide a user interface to such devices providing a menu of identifiers, each linked to a different association between location based data and a captured image. Thus, a second user may, via the Locator Server 145, access an association made by a first user. For example, a user may associate a captured image of a hiking trail with location based data, and this data may be stored in the User Database 160. The association could then be made available to others (e.g., friends, family, etc.), as they could access the association by selecting an identifier of the captured image via the user interface. They could then tap the Mapping Database 150 to create image data, maps, or suggested routes to the location. In still other embodiments, another mobile communications device 135 or other computing device 140 connected to the Internet may communicate with the Device 110 itself to access location based data associated with a captured image or identifier thereof.

As discussed above, data comprising a suggested route may be created according to various embodiments of the invention. In different embodiments, the suggested route may be text, image data, maps, or any combination thereof. The suggested route may constitute a graphical representation of the waypoints stored after an association has been made. Alternatively, a user may be queried to identify a starting location, and directions to the location associated with the captured image may be drawn from a Mapping Database. In other embodiments, a set of data identifying the current location of a device (e.g., GPS coordinates) may be received, and a suggested route from the location of that device to the location associated with the captured image may be drawn from a Mapping Database. In certain embodiments, the suggested route may be followed to the location associated with the captured image. If the Device 110 is used, the Device 110 may continue to receive location based data to ensure that the Device 110 is following the suggested route. The Device 110 may be configured to emit an audible warning if the path of the Device 110 strays from the suggested route.

Figure 3:
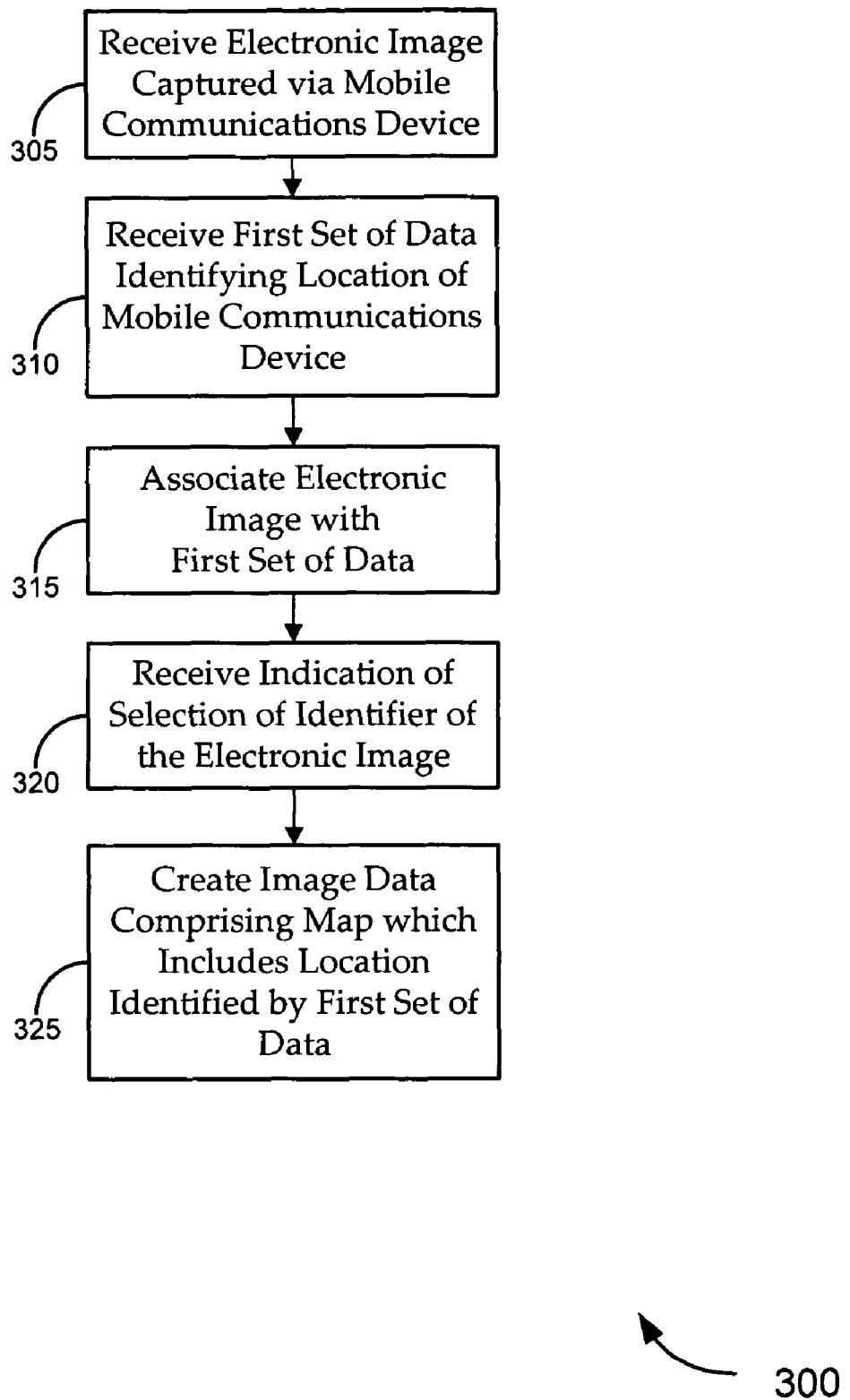
FIG. 3 is a flow diagram that illustrates a method that may be used to identify a location using a mobile communications device according to various embodiments of the present invention.

III. Exemplary Embodiments: FIG. 3 sets forth a first exemplary embodiment 300 of the invention, illustrating an example of a method for identifying a location using a mobile communications device. At block 305, an electronic image captured via a mobile communications device may be received. At block 310, a first set of data identifying the location of the mobile communications device may be received. At block 315, the electronic image may be associated with the first set of data. At block 320, an indication of the selection of an identifier of the electronic image is received. Image data comprising a map which includes a representation of the location identified by a first set of data may then be created at block 325.

Figure 4:
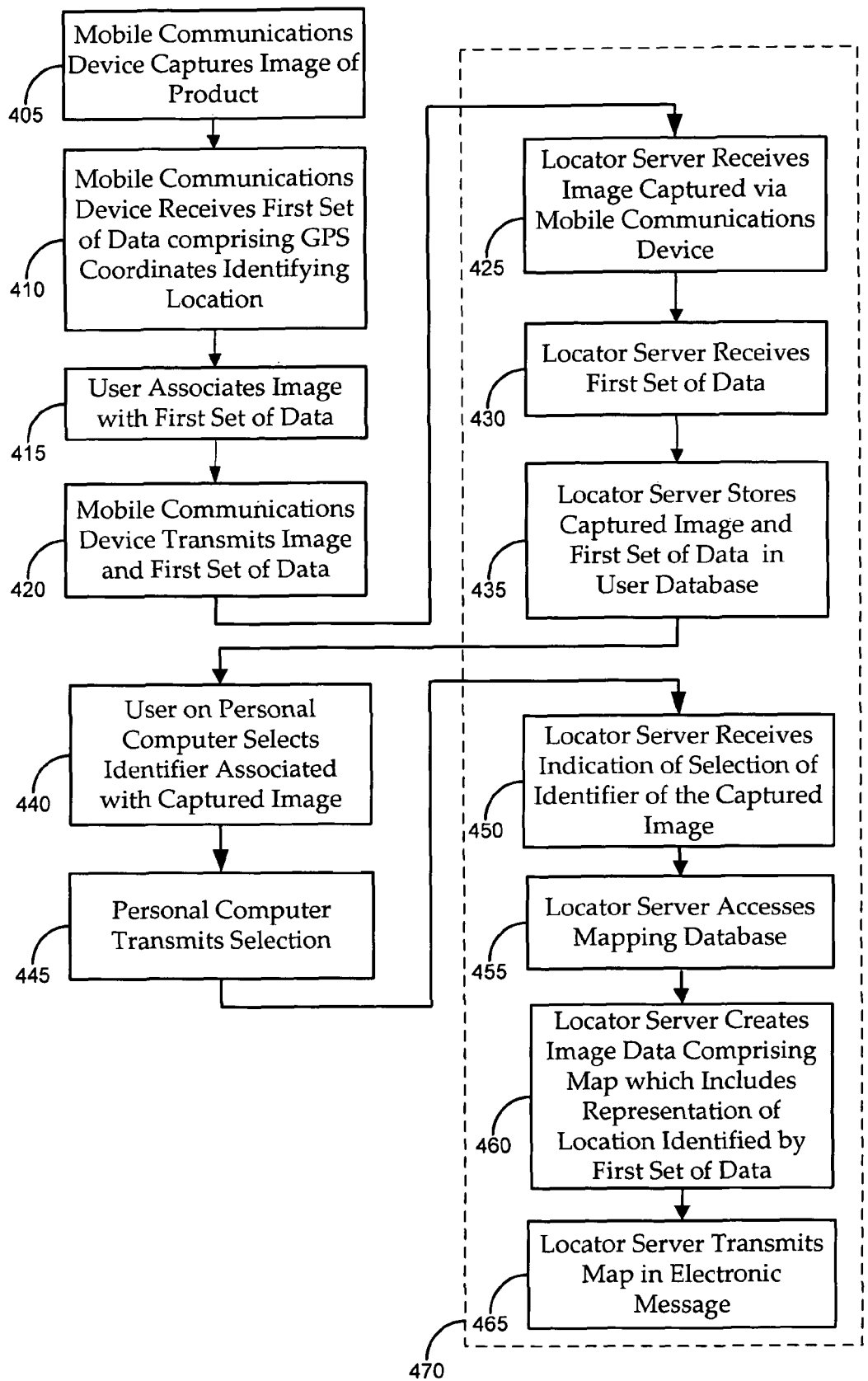
FIG. 4 is a flow diagram that illustrates a method that may be used to identify a location using a mobile communications device and a locator server according to various embodiments of the present invention.

FIG. 4 sets forth another exemplary embodiment 400 of the invention, illustrating an alternative example of a method used to identify a location using a mobile communications device and a locator server. At block 405, a Mobile Communications Device 110 may capture an image of product. The Device 110, at block 410, may then receive GPS coordinates identifying the location of the Device 110. A user, at block 415, may associate the captured image with the GPS coordinates. At block 420, the Device 110 may transmit the captured image of the product and GPS coordinates.

At block 425, the Locator Server 145 may receive the captured image transmitted by the Device 110. At block 430, the Locator Server 145 may receive the GPS coordinates. The Locator Server may then, at block 435, store the captured image and the GPS coordinates together as an associated set of data in a User Database 160.

The user may then access this association via a personal computer in communication with the Locator Server 145 via the Internet. At block 440, the user may select an identifier associated with the captured image via a user interface provided to the personal computer. At block 445, the personal computer may transmit the selection of the identifier.

At block 450, the Locator Server 145 may receive an indication of the selection of the identifier of the captured image. At block 455, the Locator Server 145 may access the Mapping Database 160. At block 460, the Locator Server 145 may create image data comprising a map which includes a representation of the location identified by the GPS coordinates. At block 465, the Locator Server 145 may transmit the map in an electronic message. The message may be directed at the personal computer, an email address, the Device 110, or any electronic address able to receive electronic communications. The dashed area indicated by reference numeral 470 represents the function performed by the Locator Server 145 according to various embodiments of the invention.

Figure 5:
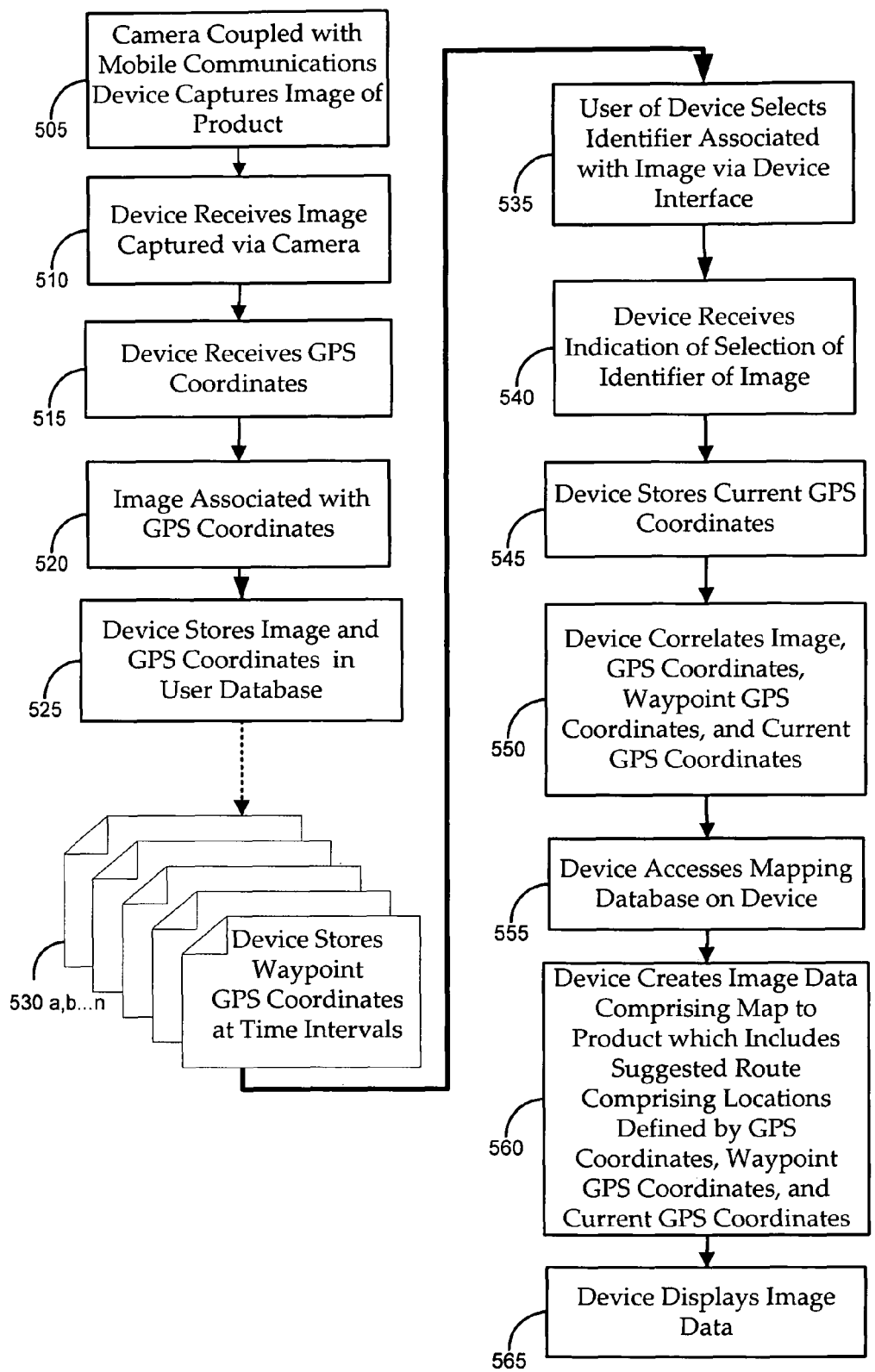
FIG. 5 is a flow diagram that illustrates a method that may be used by a mobile communications device to identify a location according to various embodiments of the present invention.

FIG. 5 sets forth yet another exemplary embodiment 500 of the invention, illustrating an alternative example 500 of a method that may be used by a mobile communications device to identify a location. At block 505, a digital camera coupled with the Mobile Communications Device 110 captures an image of a product, and the Device 110 may receive the captured image at block 510. The Device 110 may receive, at block 515, GPS coordinates identifying the location of the Device 110. At block 520, the captured image may be associated with the GPS coordinates. At block 525, the Device 110 may store the captured image and GPS coordinates as an associated set of data in a User Database 165 on the Device 110.

After the Device 110 has stored the captured image and GPS coordinates, the Device may store additional GPS coordinates received by the Device 110. These "Waypoint GPS coordinates" may be stored at regular intervals for a specified time period at block 530. In this fashion, the location, and path, of the Device 110 may be monitored from the location that the image is captured. In some embodiments, these waypoints may be stored at non-linear time intervals. For example, waypoints could be stored every second for the first ten seconds after an image is captured, then every five seconds for the next minute, and every thirty seconds for the next ten minutes. Yet another embodiment may include storing waypoints at more frequent intervals while the Device 110 is located closer to the location of captured image, and less frequently as the Device is further away. In these embodiments, one may be able to achieve better granularity around a captured image. Some embodiments may include a user selectable control interface on the screen of the Device 110 to control the waypoint storage intervals.

The mapping and suggested route functionality associated with the invention may then be initiated via a user interface on the Device. At block 535, a user may select an identifier associated with the captured image from a user interface menu. At block 540, the Device 110 may receive indication of the selection. Upon this selection, the Device 110 may store "Current GPS coordinates" for the Device 110 at block 545. The Device may then, at block 550, correlate the captured image, GPS coordinates, Waypoint GPS coordinates, and Current GPS coordinates. At block 555, the Device may access the Mapping Database 165 on the Device 110. At block 560, the Device 110 may create image data comprising a map which includes a suggested route comprising locations defined by the Current GPS coordinates, Waypoint GPS coordinates, and the GPS coordinates identifying the location of the captured image. The Device 110 may then display the created image data at block 565.

Figure 6:
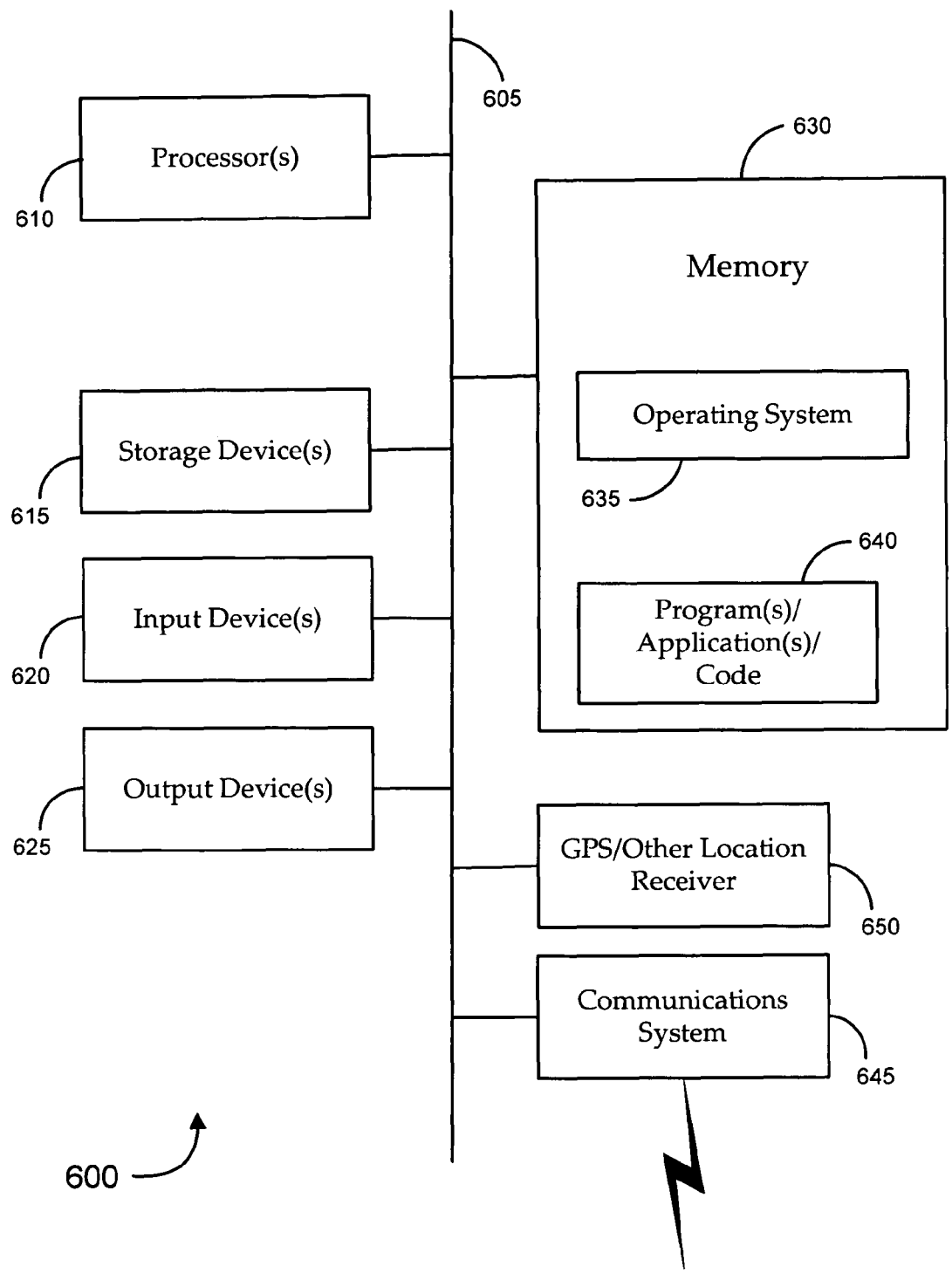
FIG. 6 is a schematic diagram that illustrates a representative device structure that may be used in various embodiments of the present invention.

IV. Computing Device Structure: A device structure 600 that may be used for a Mobile Communications Device 110, Locator Server 145, or other computer, server, or computing device described herein is illustrated with the schematic diagram of FIG. 6. This drawing broadly illustrates how individual system elements of each of the aforementioned devices may be implemented, whether in a separated or more integrated manner. The exemplary structure is shown comprised of hardware elements that are electrically coupled via bus 605, including processor(s) 610 (which may further comprise a DSP or special-purpose processor), storage device(s) 615, input device(s) 620, and output device(s) 625. The storage device(s) 615 may comprise a computer-readable storage media reader connected to any computer-readable storage medium, the combination comprehensively representing remote, local, fixed, or removable storage devices or storage media for temporarily or more permanently containing computer-readable information. The communications system 645 may comprise a wired, wireless, or other type of interfacing connection that permits data to be exchanged with other devices. The communications system(s) 645 may permit data to be exchanged with a network (including, without limitation, the Network 130). The GPS/Other Location Receiver 650 may comprise any such receiver, whether separate or more integrated, that is configured to receive location based data as described herein.

The structure 600 may also comprise additional software elements, shown as being currently located within working memory 630, including an operating system 635 and other code 640, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

V. Conclusion: It should be noted that the methods, systems and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "storage medium" or "storage device" may represent one or more devices for storing data, including read only memory (ROM), random access memory (RAM), magnetic RAM, core memory, magnetic disk storage mediums, optical storage mediums, flash memory devices or other machine readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A method of identifying a location with a mobile communications device, comprising:
    (a) receiving an electronic image captured via the mobile communications device;
    (b) receiving a first set of data identifying a first location of the mobile communications device;
    (c) associating, at the mobile communications device, the captured electronic image with the first set of data;
    (d) receiving an indication of a selection of the captured electronic image;
    (e) receiving a second set of data identifying a current location of the mobile communications device; and
    (f) creating, at the mobile communication device, a map image based at least in part on the first set of data and mapping data stored on the mobile communication device, the map image including the first location identified by the first set of data associated with the captured electronic image and a suggested route to the first location from the current location of the mobile communications device, as specified by the second set of data.

2. The method of claim 1, wherein the set of data identifying the location of the mobile communications device comprises GPS coordinates.

3. The method of claim 1, further comprising:
    receiving a plurality of additional sets of data, wherein each additional set of the plurality identifies the location of the mobile communications device at a different time within a time period.

4. The method of claim 3, wherein each additional set of the plurality represents a location measured at a regular time interval after the set of data identifying the location of the mobile communications device is received.

5. The method of claim 3, wherein the map comprises a graphical representation of each location identified by the plurality of additional sets of data.

6. The method of claim 5, wherein the mobile communications device emits an audible prompt if the user diverges from the suggested route in returning to the location identified by the first set of data.

7. The method of claim 1, wherein the electronic image comprises an image of a selection from a group consisting of an automobile, a product, a location, a person, and any combination thereof.

8. The method of claim 1, wherein the identifier comprises a selection from a group consisting of an icon, a thumbnail representation of the electronic image, the electronic image, a user-selected word, any other combination of characters, and any combination thereof.

9. A system for locating with a mobile communications device, the system comprising:
    the mobile communications device comprising an image capture device, wherein the mobile communications device is configured to:
    capture an electronic image;
    receive a first set of data identifying a first location of the mobile communications device;
    associate the captured electronic image with the first set of data;
    receive a second set of data identifying a current location of the mobile communications device; and
    create a map image based at least in part on the first set of data and mapping data stored on the mobile communication device, the map image including the first location identified by the first set of data associated with the captured electronic image and a suggested route to the first location from the current location of the mobile communication device, as specified by the second set of data.

10. The system of claim 9, wherein the mobile communications device is further configured to:
    transmit the captured image with the set of data in a first communications signal.

11. The system of claim 9, wherein a user associates the identifier with the captured image via the mobile communications device.

12. The system of claim 9, wherein,
    the mobile communications device is further configured to receive a plurality of additional sets of data identifying the location of the mobile communications device; and
    the suggested route comprises each location identified by the plurality of additional sets of data.

13. A computer program embodied on at least one physical computer readable medium, the computer program comprising instructions executable by a computer to:
    receive an electronic image captured via a mobile communications device;
    receive a first set of data identifying a first location of the mobile communications device;
    associate, at the mobile communications device, the captured electronic image with the first set of data;
    receive an indication of a selection of the captured electronic image with a second set of data identifying a current location of the mobile communications device; and
    create, at the mobile communications device, a map image based at least in part on the first set of data and mapping data stored on the mobile communication device, the map image including the first location identified by the first set of data associated with the captured electronic image and a suggested route to the first location from the from the current location of the mobile communication device, as specified by the second set of data.

* * * * *